July 9, 1946.  T. B. PERKINS  2,403,609
PHOTOELECTRIC SYSTEM
Filed Dec. 19, 1942
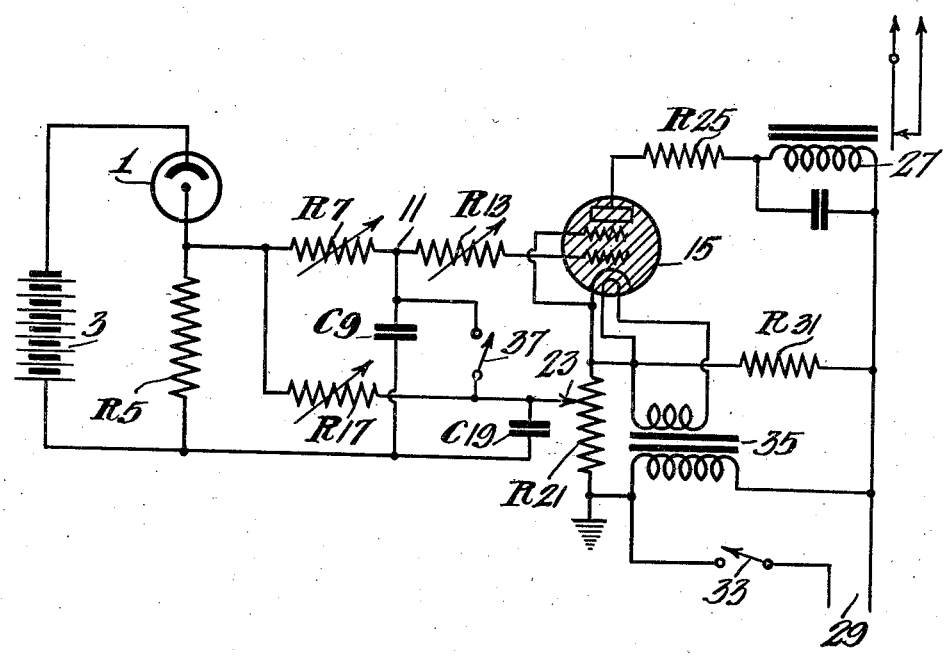
Inventor
Theodore P. Perkins
By
Attorney Patented July 9, 1946

2,403,609

UNITED STATES PATENT OFFICE 2,403,609

PHOTOELECTRIC SYSTEM

Theodore B. Perkins, West Orange, N. J., assignor to Radio Corporation of America, a corporation of Delaware Application December 19, 1942, Serial No. 469,757

7 Claims. (Cl. 250—41.5)

This invention relates to relay systems, and more particularly to an automatic photoelectric relay for controlling the operation of a device in response to a sudden change of light intensity, substantially independently of the actual light intensity.

Photoelectric relays are widely used to detect changes in light intensity for the purpose of giving alarm, starting or stopping various mechanisms, controlling operations in manufacturing, and so on.

One difficulty which frequently arises is caused by changes in the ambient illumination which may produce false operation of the relay. In general, the more sensitive the system is made to small changes in light intensity, the more serious this effect becomes.

It has been proposed to provide relays of this type with such characteristics that they respond only to the rate of change of light intensity, rather than to the intensity itself. This enables the system to be made extremely sensitive to variations which take place at greater than a predetermined rate, without encountering difficulties due to the relatively much slower ambient variations caused by daylight and darkness, clouds, etc.

Accordingly it is the principal object of the present invention to provide an improved method of and means for providing response to change in illumination, independently of the degree of light intensity.

A further object is to provide an improved photoelectric relay circuit arranged to enable convenient adjustment of the rate of change of light intensity to which response will occur.

These and other and incidental objects will become apparent to those skilled in the art upon consideration of the following description, with reference to the accompanying drawing, which is a schematic circuit diagram of an embodiment of the invention.

A photoelectric cell 1 is connected to a direct current source such as a battery, 3, through a load resistor, R5. A resistor R7 and a capacitor C9 are connected in series across the load resistor R5. The junction 11 between the resistor R7 and capacitor C9 is connected through a resistor R13 to the control grid of the gas filled discharge tube 15. The tube 15 may be an RCA 2051 or equivalent type. A second network, comprising a resistor R17 and a capacitor C19 is connected across the load resistor R5. The cathode circuit of the tube 15 includes a resistor R21, provided with an adjustable tap 23, which is connected to the junction of the resistor R17 and the capacitor C19.

The anode circuit of the tube 15 includes a resistor R25 and a relay 27. The relay 27 is connected to one side of an A.-C. supply 29, and through a resistor R31 to the cathode of the tube 15. The other side of the A.-C. supply 29 is connected through a switch 33 to the resistor R21. A stepdown transformer 35 is provided for energizing the heater of the tube 15. A switch 37 is included between the junction point 11 and the adjustable tap 23. The adjustment and operation of the circuit is as follows:

The output of the photo cell 1 is applied to both the grid and the cathode of the tube 15 through circuits of different time constants, R7—C9 and R17—C19 respectively. With the proper adjustments of these time constants, slowly varying light will not establish a potential which will ionize the gas in the tube 15 because the potentials applied to the grid and cathode are equal. The time constant of the circuit R17—C19 and of the circuit R7—C9 may be adjusted to determine the fastest and slowest variation of light to which the circuit will respond. The relative time constants of the circuits R17—C19 and R7—C9 in combination with the polarity of the phototube, its polarizing battery and the initial condition of the gas tube, 15, as determined by the setting of the tap 23, determine whether a decrease or an increase in light will energize or deenergize the relay. For example: For the polarity of the phototube and polarizing battery shown in the sketch, and the adjustment of the tap 23 such as not to fire tube 15 with switch 37 closed, when R17—C19 is of higher time constant than that of R9—C9 a decrease in light will operate the relay. When the time constant ratio is reversed an increase of the light will operate the relay. A reversal of the phototube and polarizing battery will cause the effects of the time-constant ratio to be reversed. Initial adjustment of the tap 23 such as to fire the tube 15 with switch 37 closed will necessitate reversed time constant ratios on phototube and polarizing battery polarity, as described above to cause deenergization of the relay.

The resistor R13 is included to prevent the relay from "holding" subsequent to its actuation. Without this resistance the capacitors C9 and C19 will charge, whenever the gas in the tube 15 is ionized, and will remain charged during the negative half cycles of plate voltage, re-ionizing the gas with each positive half cycle. If this type of operation is required, the resistor R13 may be omitted. The switch 37 is provided to equalize the changes of the capacitors C9 and C19 to restore normal starting conditions if necessary.

Suppose that the variable tap, 23, on the resistor R21 is adjusted until the tube 15 does not fire upon application of plate voltage. Then if R17—C19 is of higher time constant than R7—C9 when light falls on the phototube the gas discharge tube 15 will still be non-conductive and will gradually acquire a grid bias determined by the drop in the resistor R21. With slowly varying light such as daylight changes, the grid to cathode potential will remain constant. Upon the sudden interruption of the light the capacitor C9 discharges much more rapidly than the capacitor C19 resulting in a positive bias on the grid of the tube 15, causing the gas to ionize and operate the relay 27.

Thus the invention has been described as an improved photoelectric relay including means to provide response to variation in light intensity independent of the actual intensity itself. This is accomplished by applying the output of a photoelectric cell to both the grid and the cathode of a gaseous discharge tube through the delay networks of differing constants. The delay in the cathode and grid networks are adjusted to determine the slowest change and the fastest change to which this system will respond. Adjustments of the relative time constants at the grid and cathode networks together with the polarity of the phototube and battery as well as the adjustment at the initial grid bias at the tube will determine whether the relay is energized or de-energized upon an increase or decrease of light. The device may be operated to hold indefinitely after actuation or reset automatically by a simple change in the circuit.

I claim as my invention:

1. A photoelectric relay device including a gaseous discharge tube provided with a control grid, a cathode and an anode, a pair of time delay networks having different delay constants, and each having an input circuit and an output circuit, said output circuits being connected in series between said control grid and said cathode, and a photoelectric cell connected to said input circuits in parallel.

2. A relay circuit including voltage responsive discharge means, a source of control energy, and connections from one side of said source to opposite sides of the input circuit of said discharge means, said connections including time delay networks of differing time constants, each of said networks including an input terminal connected to said source and an output terminal connected to said discharge means, and a terminal common to both input and output circuits, said common terminals being connected together to the other side of said source.

3. A relay circuit including a discharge tube provided with a control grid, a cathode and an anode, a source of control voltage, means applying the output of said source in the same polarity to both said grid and said cathode, and delaying the application of said output to said cathode with respect to the application of said output to said control grid.

4. A relay circuit including voltage responsive discharge means having two input terminals, a source of control voltage having two output terminals, a resistor connected between one of said output terminals and one of said input terminals, a second resistor connected between said one output terminal and the other of said input terminals and capacitors connected from each of said input terminals to the other of said output terminals, the numerical product of the values of said resistor and said capacitor connected to one of said input terminals being greater than the numerical product of the values of said resistor and said capacitor connected to the other of said input terminals.

5. A system for producing, in response to a varying voltage, a voltage substantially proportional in magnitude to the rate of change of said varying voltage, including two low pass filter sections of different time constants, means applying said varying voltage to the inputs of said filter sections in the same polarity, and means combining the outputs of said filter sections in opposite polarities.

6. The invention as set forth in claim 5, wherein the inputs of said filter sections are connected in parallel and the outputs of said filter sections are connected in series.

7. The invention as set forth in claim 5, wherein each of said filter sections, as viewed from its output circuit, includes a series resistor and a shunt capacitor.

THEODORE B. PERKINS.